United States Patent
McCormick et al.

(10) Patent No.: US 6,805,034 B1
(45) Date of Patent: Oct. 19, 2004

(54) SILICON CARBIDE ARMOR BODIES, AND METHODS FOR MAKING SAME

(75) Inventors: Allyn L. McCormick, Lewes, DE (US); Michael K. Aghajanian, Newark, DE (US)

(73) Assignee: M Cubed Technologies, Inc., Monroe, CT (US)

(*) Notice: Subject to any disclaimer, the term of this patent is extended or adjusted under 35 U.S.C. 154(b) by 140 days.

(21) Appl. No.: 10/286,405

(22) Filed: Nov. 1, 2002

Related U.S. Application Data

(62) Division of application No. 09/757,826, filed on Jan. 10, 2001.
(60) Provisional application No. 60/252,489, filed on Nov. 21, 2000, and provisional application No. 60/175,389, filed on Jan. 11, 2000.

(51) Int. Cl.[7] ............................... F41H 5/00; D02G 3/00
(52) U.S. Cl. .................... 89/36.01; 89/36.05; 428/368; 428/373; 428/704; 264/603; 264/682
(58) Field of Search ...................... 89/36.01, 36.05, 89/36.07; 428/368, 373, 698, 704; 264/603, 682, 29.1

(56) References Cited

U.S. PATENT DOCUMENTS

| | | |
|---|---|---|
| 3,796,564 A | 3/1974 | Taylor et al. |
| 3,857,744 A | 12/1974 | Moss |
| 3,859,399 A | 1/1975 | Bailey et al. |
| 3,951,587 A | 4/1976 | Alliegro et al. |
| 3,998,646 A | 12/1976 | Weaver |
| 4,019,913 A | 4/1977 | Weaver et al. |
| 4,154,787 A | 5/1979 | Brown |
| 4,294,788 A | 10/1981 | Laskow |
| 4,692,418 A | 9/1987 | Boecker et al. |
| 4,693,988 A | 9/1987 | Boecker et al. |
| 4,868,040 A | 9/1989 | Hallal et al. |

(List continued on next page.)

FOREIGN PATENT DOCUMENTS

| | | |
|---|---|---|
| WO | WO 82/01545 A1 | 5/1982 |
| WO | WO 91/07633 A1 | 5/1991 |
| WO | WO 98/42634 A1 | 10/1998 |
| WO | WO 00/062007 A2 | 10/2000 |

OTHER PUBLICATIONS

Dennis J. Viechnicki, Michael J. Slavin and Morton I. Kliman, "Development and Current Status of Armor Ceramics", *Ceramic Bulletin*, vol. 70, No. 6, pp. 1035–39 (1991).

(List continued on next page.)

*Primary Examiner*—J. Woodrow Eldred
(74) *Attorney, Agent, or Firm*—Law Office of Jeffrey R. Ramberg

(57) ABSTRACT

Silicon infiltration technology is used to produce ceramic bodies having utility as ballistic armor. In a first aspect of the invention, the ballistic armor includes a reaction-bonded silicon carbide body (RBSC). Good ballistic performance can be advanced by loading the permeable mass or preform to be infiltrated to a high degree with one or more hard fillers, and by limiting the size of the largest particles making up the mass. In a second aspect, the silicon infiltration technology, e.g., siliconizing or reaction-bonding, is used to bond silicon carbide fibers to at least the back surface of a ceramic armor body, thereby enhancing ballistic stopping power. A third aspect of the invention pertains to the ability to engineer RBSC bodies such that there is little dimensional change during processing, thereby permitting high dimensional reproducibility in large-scale production.

21 Claims, 3 Drawing Sheets

U.S. PATENT DOCUMENTS

| | | | |
|---|---|---|---|
| 4,876,941 A | | 10/1989 | Barnes et al. |
| 5,094,901 A | * | 3/1992 | Gray .......................... 428/141 |
| 5,205,970 A | | 4/1993 | Brun et al. |
| 5,372,978 A | | 12/1994 | Ezis |
| 5,552,352 A | * | 9/1996 | Brun et al. ................... 501/88 |
| 5,628,938 A | * | 5/1997 | Sangeeta et al. .............. 264/28 |
| 5,840,221 A | * | 11/1998 | Lau et al. .................. 264/29.7 |
| 5,962,103 A | * | 10/1999 | Luthra et al. ............... 428/107 |
| 6,245,424 B1 | * | 6/2001 | Lau et al. ................... 428/368 |
| 6,347,446 B1 | * | 2/2002 | Luthra et al. ............ 29/402.18 |

OTHER PUBLICATIONS

D. Viechnicki, W. Blumenthal, M. Slavin, C. Tracy, and H. Skeele, "Armor Ceramics—1987", pp. 27–53, presented at Third TACOM Armor Coordinating Conference, Feb. 17–19, 1987, Monterey, California.

Roy C. Laible, "Ceramic Composite Armor", in *Ballistic Materials and Penetration Mechanics*, pp. 150–151, Elsevier Scientific Publishing Co., (1980).

C.W. Forrest, P. Kennedy and J.V. Shennan, "The Fabrication and Properties of Self–Bonded Silicon Carbide Bodies", *Special Ceramics 5*, pp. 99–123 (1972).

* cited by examiner

SILICON CARBIDE ARMOR BODIES, AND METHODS FOR MAKING SAME

CROSS-REFERENCE TO RELATED APPLICATIONS

This is a Divisional of U.S. patent application Ser. No. 09/757,826, pending filed on Jan. 10, 2001, which claimed the benefit of Provisional Application No. 60/252,489, filed on Nov. 21, 2000, as well as Provisional Application No. 60/175,389, filed on Jan. 11, 2000. The contents of each of these commonly owned patent applications are expressly incorporated herein by reference.

BACKGROUND OF THE INVENTION

1. Field of the Invention

This invention relates to ballistic armor structures produced using silicon infiltration technology. More particularly, the invention relates to infiltration techniques to form silicon carbide composite armor bodies, e.g., reaction-bonded silicon carbide bodies, and/or to fuse silicon carbide fibers to a back surface of a ceramic armor body.

2. Discussion of Related Art

In many armor applications, weight is not a critical factor, and traditional materials such as steel can offer some level of protection from airborne kinetic energy threats such as ballistic projectiles and shell fragments. Steel armors offer the advantage of low cost and the fact that they also can serve as structural members of the equipment into which they are incorporated. In recent decades, certain hard ceramic materials have been developed for certain armor applications. These ceramic-based armors, such as alumina, boron carbide and silicon carbide provide the advantage of being lighter in mass than steel for the same level of protection. Thus, in applications in which having an armor having the lowest possible mass is important, such as (human) body armor and aircraft armor, low specific gravity armor materials are called for. The lower the density, the greater the thickness of armor that can be provided for the same areal density. In general, a thick armor material is more desirable than a thinner one because a greater volume of the armor material can be engaged in attempting to defeat the incoming projectile. Moreover, the impact of the projectile on a thicker armor plate results in less tensile stress on the face of the plate opposite that of the impact than that which would develop on the back face of a thinner armor plate. Thus, where brittle materials like ceramics are concerned, it is important to try to prevent brittle fracture due to excessive tensile stresses on the back face of the armor body; otherwise, the armor is too easily defeated. Rather, by preventing such tensile fracture, the kinetic energy of the projectile perhaps can be absorbed completely within the armor body, which energy absorption manifests itself as the creation of a very large new surface area of the armor material in the form of a multitude of fractures, e.g., shattering.

U.S. Pat. No. 5,372,978 to Ezis discloses a projectile-resistant armor consisting predominantly of silicon carbide and made by a hot pressing technique. Up to about 3 percent by weight of aluminum nitride may be added as a densification aid. The finished product features a microstructure having an optimal grain size of less than about 7 microns. Fracture is intergranular, indicating energy-absorbing crack deflection. Moreover, the economics of manufacturing are enhanced because less expensive, less pure grades of silicon carbide can be used without compromising the structural integrity of the material.

U.S. Pat. No. 4,604,249 to Lihleich et al. discloses a composition particularly suited for armoring vehicles. The composition is a composite of silicon carbide and steel or steel alloy. Silicon and carbon particulates, optionally including silicon carbide particulates, are mixed with an organic binder and then molded to form a green body. The green body is then coked at a maximum temperature in the range of about 800° C. to about 1000° C. The temperature is then rapidly raised to the range of about 1400° C. to about 1600° C. under an inert atmosphere of at least one bar pressure. In this temperature range, the silicon and carbon react to form silicon carbide, thereby producing a porous body. The pores are then evacuated in a vacuum chamber, and the body is immersed in molten steel or steel alloy. The metal fills up the pores to produce a dense composite armor material.

U.S. Pat. No. 3,725,015 to Weaver discloses composite refractory articles that, among other applications, have utility as an armor material for protection against penetration by ballistic projectiles. These compositions are prepared by cold pressing a mixture of a powdery refractory material and a carbonaceous material to form a preform, heat-treating the preform to convert the carbonaceous material to carbon, and then contacting the heated preform with a molten metal bath, the bath containing at least two metals. The molten metal infiltrates the preform, the refractory material matrix sinters and at least one of the metallic constituents reacts with the carbon to produce a metal carbide. Because the thermal expansion coefficient of the metal mixture is close to or slightly greater than that of the refractory matrix, the composite shape cools to room temperature essentially free of cracks and residual stress. Weaver states that, while there are no rigid particle size parameters except those dictated by the properties desired in the final product, a maximum size of about 350 microns for the particles of the powdered materials that make up the mixture to be pressed is preferred.

U.S. Pat. No. 3,796,564 to Taylor et al. discloses a hard, dense carbide composite ceramic material particularly intended as ceramic armor. Granular boron carbide is mixed with a binder, shaped as a preform, and rigidized. Then the preform is thermally processed in an inert atmosphere with a controlled amount of molten silicon in a temperature range of about 1500° C. to about 2200° C., whereupon the molten silicon infiltrates the preform and reacts with some of the boron carbide. For armor applications, Taylor places a limit of 300 microns as the maximum size for the granular boron carbide component. The formed body comprises boron carbide, silicon carbide and silicon. Taylor states that such composite bodies may be quite suitable as armor for protection against low caliber, low velocity projectiles, even if they lack the optimum properties required for protection against high caliber, high velocity projectiles.

U.S. Pat. No. 3,857,744 to Moss discloses a method for manufacturing composite articles comprising boron carbide. Specifically, a compact comprising a uniform mixture of boron carbide particulate and a temporary binder is cold pressed. Moss states that the size of the boron carbide particulate is not critical; that any size ranging from 600 grit to 120 grit may be used. The compact is heated to a temperature in the range of about 1450° C. to about 1550° C., where it is infiltrated by molten silicon. The binder is removed in the early stages of the heating operation. The silicon impregnated boron carbide body may then be bonded to an organic resin backing material to produce an armor plate.

U.S. Pat. No. 3,859,399 to Bailey discloses infiltrating a compact comprising titanium diboride and boron carbide with molten silicon at a temperature of about 1475° C. The compact further comprises a temporary binder that, optionally, is carbonizable. Although the titanium diboride remains substantially unaffected, the molten silicon reacts with at least some of the boron carbide to produce some silicon carbide in situ. The boron carbide filler is generally limited to about 150 microns in size, but since the titanium diboride component does not appear to react with the silicon under the local process conditions, there is no critical upper limit of its particle size. When certain shaping techniques such as extrusion are employed, however, it is often desirable to limit the particle size to about 125 microns or less. The flexural strength of the resulting composite body was relatively modest at about 140 MPa. A variety of applications are disclosed, including personnel, vehicular and aircraft armor.

Each of the above-described armor inventions suffers from one shortcoming or another. Hot pressing is expensive and shape-limited. Hot pressed or sintered ceramics do not hold dimensional tolerances as well as reaction-bonded silicon carbide ("RBSC"). Iron matrix composite materials are heavy in relation to ceramic armors. An infiltration temperature of 2200° C. is too high, and will likely result in exaggerated grain growth. The particles making up the porous bodies to be reactively infiltrated are substantially larger than those used by the instant inventors.

As the preceding synopsis of the patent literature indicates, reaction-bonded or reaction-formed silicon carbide has been proposed and evaluated as a candidate armor material as long ago as the 1960's.

In the Third TACOM Armor Coordinating Conference in 1987, Viechnicki et al. reported on the ballistic testing of a RBSC material versus sintered and hot pressed silicon carbide materials. Not only was the RBSC substantially inferior to the other silicon carbides, Viechnicki et al. came to the general conclusion that purer, monolithic ceramics with minimal amounts of second phases and porosity have better ballistic performance than multiphase and composite ceramics. (D. J. Viechnicki, W. Blumenthal, M. Slavin, C. Tracy, and H. Skeele, "Armor Ceramics—1987," Proc. Third TACOM Armor Coordinating Conference, Monterey, CA (U.S. Tank-Automotive Command, Warren, Mich., 1987) pp. 27–53).

Accordingly, in spite of the price advantage of RBSC relative to sintered or hot pressed silicon carbide, what the market has preferred has been a sintered or hot pressed monolithic ceramic product. As of the beginning of the year 2000, there was little or no RBSC armor on the market.

The details of a ballistic impact event are complex. One widely held theory of defeating a ballistic projectile is that the armor should be capable of fracturing the projectile, and then erode it before it penetrates the armor. Thus, compressive strength and hardness of a candidate armor material should be important. The above-mentioned armor patent to Taylor discloses a modulus of rupture as high as 260 MPa, and furthermore states that for armor applications the strength should be at least 200 MPa.

There seems to be a consensus in the armor development community that hardness is indeed important in a candidate armor material, and in particular, that the hardness of the armor should be at least as great as the hardness of the projectile. As for the strength parameter, however, those testing armor materials have had a difficult time correlating mechanical strength (both tensile and compressive) with ballistic performance. In fact, except for hardness, there is no single static property that is a good predictor of good armor characteristics in ceramic materials. Instead, the guidance that has been provided from the armor developers to the materials developers based upon actual ballistic tests has been that candidate armors in general should possess a combination of high hardness, high elastic modulus, low Poisson's ratio and low porosity. (Viechnicki et al., p. 32–33)

U.S. Pat. No. 5,205,970 to Brun et al. discloses a method for making silicon carbide bodies having improved surface finish. In particular, reaction-bonded or reaction-formed silicon carbide bodies are produced by reactively infiltrating silicon into a porous carbonaceous preform to form a silicon carbide body. Excess infiltrant is provided to provide for complete infiltration and filling of porosity in the preform. After infiltration, the excess infiltrant appears as excess droplets on the surface of the reaction-formed body. The formed body is then placed in contact with a wicking means, such as a piece of carbon cloth and re-heated above the infiltrant melting temperature. Excess infiltrant is wicked from the surface of the body into the wicking means by capillary force. Moreover, the wicking means is readily removed from the formed body, as the excess infiltrant that had previously bonded the wicking means to the body has been removed. Any residual wicking means material remaining on the reaction-formed body can be removed by light grinding or diamond polishing.

Another patent to Weaver, namely U.S. Pat. No. 4,019,913, discloses a method for making a high strength RBSC body. Specifically, about 3 micron diameter silicon carbide powder was roll mixed with about 18 percent by weight of colloidal graphite and distilled water. After drying and screening, a tile was cold pressed to yield a silicon carbide filler loading of about 52–53 percent by volume. The preform tile was then infiltrated with silicon at a temperature of about 2070° C. in a nitrogenous atmosphere. The resulting composite body had a final density of about 3.02 g/cc and had a flexural strength of about 530–550 MPa.

Neither Brun nor Weaver '913 advances any suggestion that their materials would be suitable armor materials.

The instant inventors have re-visited RBSC as a candidate armor material because they believe that a RBSC material can be developed whose anti-ballistic performance is competitive with other armor ceramics, such as the hot pressed armors, but at reduced cost.

SUMMARY OF THE INVENTION

It is an object of the instant invention to produce a ballistic armor whose ballistic performance at least approaches that of commercially available ceramic armors such as alumina or hot pressed boron carbide.

It is an object of the instant invention to produce a lightweight composite material that has utility as armor against ballistic projectiles, and specifically to engineer RBSC as an armor material.

It is an object of the instant invention to produce a ballistic armor less expensively than hot pressed ceramic armors.

It is an object of the instant invention to produce a ballistic armor, particularly a body armor having a complex shape, to a tighter or closer dimensional tolerance in the as-thermally processed condition than can be achieved by hot pressing or sintering.

These objects and other desirable attributes can be achieved through the application of reactive infiltration techniques to the production of ceramic armor bodies, or to the bonding of silicon carbide fibers to a surface of a ceramic armor body. The particular reactive infiltration technique of primary interest in this patent disclosure is that of reaction-formed or reaction-bonded silicon carbide. According to this technique, a molten infiltrant containing silicon is contacted to a permeable mass containing at least some carbon. The molten infiltrant infiltrates the permeable mass without a pressure or vacuum assist to form a composite body of near theoretical density. Concurrent with the infiltration, the silicon component of the infiltrant reacts with at least the free carbon in the permeable mass to form in-situ silicon carbide.

In a first aspect of the instant invention, the ceramic armor bodies themselves are made of the reaction-bonded silicon carbide material. In accordance with this first aspect of the instant invention, and specifically where the objective is the production of a superior armor material, the instant inventors have discovered that it is important to place an upper limit on the size of the grains or crystallites making up the composite body. Specifically, it is recommended that no more than about 10 percent by volume of the grains be larger than about 100 microns in size. Thus, a very desirable armor material can be produced when the known hardness requirement is combined with a relatively fine-grained microstructure. Being a composite material, the hardness of a RBSC body is proportional to the loading or volume fraction of the hard phases, such as SiC. The preferred approach in the instant invention for achieving high loading of hard phase is to provide a permeable mass or preform that is at least relatively highly loaded in one or more hard phases, with SiC being particularly preferred. The instant reaction-bonded silicon carbide (RBSC) composite bodies surpass previous RBSC's as armor materials, and in this capacity approach the ballistic performance of carbide armor ceramics presently in production but feature potentially lower cost manufacturing methods, e.g., infiltration techniques.

The instant inventors also realize that careful attention must also be paid to reaction or thermal processing conditions, otherwise, the care in fabricating a relatively fine-grained, highly loaded preform may be of little value. For example, while it is possible to maximize the loading of silicon carbide in the resulting composite body by producing large quantities of silicon carbide matrix phase in-situ, e.g., via reaction of the silicon infiltrant with large amounts of the carbon source contained within the preform, such an approach is not preferred, as will be discussed in greater detail to follow. Thus, the amount of free carbon in the preform that is available to react with the infiltrating silicon-containing melt should be kept below about 10 percent by volume. Further, the thermal processing conditions of time and temperature should be regulated to avoid excessive grain growth. More exactly, one should limit the peak processing temperature, and time-at-temperature.

In accordance with a second aspect of the instant invention, silicon infiltration technology is used to bond silicon carbide fibers to the back face (e.g., the face opposite the impact face) of a ceramic armor body, thereby enhancing ballistic performance. The fibers generally are of the continuous type, and typically are bonded to the armor body by reaction-bonding or siliconizing. Thus, the fibers may be provided in the form of a silicon carbide precursor such as carbon. While the fibers may be provided independent of one another, in a preferred embodiment they are stitched or otherwise joined to one another, e.g., as a woven or non-woven cloth.

Because of the nature of bonding the fibers to the armor body, the above-mentioned RBSC system is a natural choice for the armor body. In a preferred embodiment of this aspect of the invention, a fibrous carbon cloth is contacted to the back face of an armor body preform comprising silicon carbide particulate and carbon. A molten infiltrant comprising silicon is then contacted to the cloth or preform or to both, where it infiltrates both the cloth and the preform in an inert atmosphere or vacuum, and chemically converts carbon to silicon carbide. The carbon cloth is thus chemically converted to a layer containing silicon carbide fibers; the preform is similarly converted to a reaction-bonded silicon carbide body. The infiltration of the cloth and preform by the molten infiltrant fuses one to the other.

The above-mentioned technique should not be limited to the instant RBSC systems, but should also work with other RBSC systems. It should also work with reaction-formed silicon nitride, siliconized silicon carbide and other silicon carbide ceramics, such as those produced by hot pressing or sintering.

Reaction-bonded silicon carbide composite bodies are generally cheaper to manufacture than hot pressed silicon carbide bodies. Additionally, the instant RBSC composite materials maintain their size and shape better than do hot pressed silicon carbide bodies, as expressed or measured by dimensional tolerances. The ability to make ceramic armor plates having complex shaped curves that faithfully reproduce the desired shape can have significant value in meeting the form and fit requirements of the armor purchaser. Typically, armor for weight sensitive applications is specified for purchase in terms of meeting some minimum ballistic performance parameter and meeting some maximum weight or areal density. Because the objective is high ballistic performance and low areal density, both of which parameters are related to thickness but trending in opposite directions, one wants as uniform a thickness to the armor as possible. Thus, in a third important aspect of the instant invention, this potential of RBSC to produce highly dimensionally accurate shaped articles is put to use in the production of armor.

Definitions

"Areal Density", as used herein, means the mass of an armor system per unit area.

"Ballistic stopping power", as used herein, means the $V_{50}$ projectile velocity per unit of total areal density.

"Fine-grained", as used herein, means that the morphological features making up the microstructure of the reaction-bonded silicon carbide bodies of the instant invention are smaller than the microstructural features of much of the reaction-bonded silicon carbide presently on the market. Preferably, the microstructure of the instant reaction-bonded silicon carbide bodies is engineered such that the vast majority of morphological features do not exceed about 100 microns in size.

"Inert Atmosphere", as used herein, means an atmosphere that is substantially non-reactive with the infiltrant or the permeable mass or preform to be infiltrated. Accordingly, this definition includes gaseous constituents that might otherwise be thought of as mildly reducing or mildly oxidizing. For example, forming gas, comprising about 4 percent hydrogen, balance nitrogen, might be considered an inert atmosphere for purposes of the instant disclosure, as long as the hydrogen does not reduce the filler material and as long as the nitrogen does not appreciably oxidize the infiltrant or filler material.

"Infiltrant", as used herein, refers to the source of metal or metal alloy used to reactively infiltrate a permeable mass or preform to produce a reaction-bonded silicon carbide body. For purposes of this disclosure, elemental silicon is considered a metal.

"Infiltrant phase", as used herein, refers to the metal or metal alloy phase located within a reaction-bonded silicon carbide body.

"RBSC", as used herein, means "Reaction Bonded Silicon Carbide".

"Reaction-Bonding", "Reaction-Forming", "Reactive Infiltration" or "Self-Bonded", as used herein, means the infiltration of a permeable mass comprising carbon in a form that is available to react with an infiltrant comprising silicon to produce a ceramic body comprising at least some silicon carbide produced in-situ.

"Siliconizing", as used herein, means the infiltration of a permeable mass with a molten infiltrant comprising silicon, at least the silicon constituent being substantially non-reactive with the constituents of the permeable mass to produce a composite body having a matrix comprising silicon.

"Total areal density", as used herein, means the areal density of ceramic armor material plus the areal density of any other material that should properly be considered to be a part of the assembly of components making up an armor system. Examples of other materials would be fiber-reinforced polymeric materials frequently used to back up or encase a ceramic armor plate.

DETAILED DESCRIPTION OF THE INVENTION AND PREFERRED EMBODIMENTS

Figure 1:
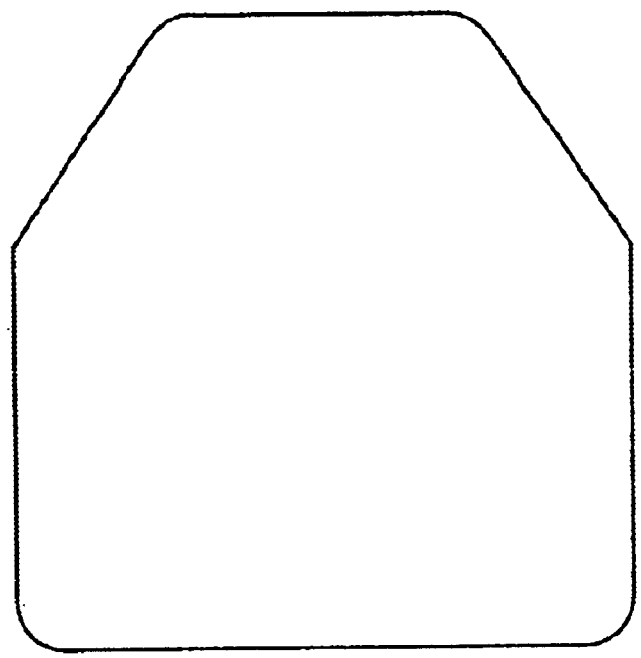
FIG. 1 is a planar projection of a front view of an armor breastplate such as described in Example 1.

In accordance with the instant invention, a substantially pore-free, mechanically strong composite material is produced that comprises a large volume fraction of one or more exceptionally hard materials such as silicon carbide. Furthermore, by placing an upper limit on the size of the reinforcement particles and through careful control of the processing conditions, a superior armor material can be achieved. In addition, the composite bodies produced according to the instant invention maintain dimensional tolerances upon thermal processing better than do hot pressed or sintered bodies.

As stated above, silicon carbide, a candidate material having very desirable hardness for certain applications envisioned by the instant invention, is difficult to fully density by traditional approaches such as by sintering. Such materials are amenable to hot pressing, but hot pressing has its drawbacks, for example, its expense and limitations of the possible geometries that can be produced without extensive machining.

Thus, for economy and manufacturing flexibility, among other reasons, the composite armor bodies of the instant invention are usually produced by a reactive infiltration technique, usually termed "reaction forming" or "reaction bonding". In this process, a molten infiltrant comprising silicon is contacted to a permeable mass comprising carbon and one or more hard ceramic filler materials such as silicon carbide. The molten silicon-based material infiltrates the interconnected porosity in the permeable mass or preform. Concurrently, the silicon reacts with the carbon in the permeable mass or preform to form silicon carbide. The amount of infiltrant is generally provided in such a quantity that the carbon in the permeable mass or preform is completely reacted to silicon carbide, with sufficient additional infiltrant supplied to fill any remaining void space between the filler material and the in-situ silicon carbide. The resulting composite materials feature a matrix of the in-situ silicon carbide. Dispersed throughout the matrix is the filler and residual, unreacted infiltrant material. As the residual infiltrant is often interconnected, it is sometimes considered as part of the matrix of the composite.

In terms of the preferred processing conditions, atmospheres that are compatible with this type of infiltration include vacuum or inert atmospheres such as argon, although vacuum is preferred. The vacuum does not have to be "hard" or high vacuum; that provided by a mechanical "roughing" pump is entirely adequate. The infiltration may be conducted at most any temperature between the liquidus or melting point of the infiltrant and its boiling point under the local processing conditions. Although the infiltration tends to be more robust at the higher temperatures, it is also more aggressive. In particular, the infiltrant is more reactive at the higher temperatures, which could give rise to unwanted side reactions. Further, it is more difficult to confine the infiltrant spatially at higher temperatures. Moreover, higher processing temperatures are more likely to give rise to exaggerated grain growth. For all of these reasons, the preferred processing temperatures are those that are generally low yet consistent with reliable infiltration. For infiltrating commercially pure silicon into a silicon carbide particulate mass in a rough vacuum environment, temperatures in the range of about 1450° C. to 1600° C. should be satisfactory.

A first major aspect of the instant invention relates to the specific application of the instant RBSC materials as armor for stopping ballistic projectiles. To defeat the incoming projectile, such ceramic armors usually feature at least two layers made up of very dissimilar materials. Namely, at a minimum, an armor system contains a ceramic layer and a backing layer, which typically are bonded to one another. As the name suggests, relative to the direction of travel of the projectile, the backing layer is placed behind the ceramic layer. Sometimes, one or more layers of a protective material are also placed in front of the ceramic layer, but these are usually for the purpose of protecting the ceramic from fractures due to routine handling (or mishandling). The purpose of the ceramic layer is to "process" the projectile, such as by flattening or shattering it. The role of the backing layer is to then "catch" the processed projectile as well as any backward propelled fragments of the ceramic layer. The backing layer may be made of metals such as aluminum, steel or titanium, which for vehicular armor, may be the structure of the vehicle itself. Where lightweight armor is needed, the backing layer typically is a fiber-reinforced polymeric (FRP) material. The fibers employed in these backing layers include polyethylene, aramid and glass fibers. A well-known FRP backing material goes by the tradename "SpectraShield", registered to AlliedSignal Inc. (now owned by Honeywell International Inc.); however, several such FRP backing materials are commercially available.

Armor generally takes the form of a plate, but the plates need not be flat, regular polygons. Often, the armor plates must be shaped to conform to the underlying structure to be protected. Body armor, for example, is often curved in one or more dimensions to better conform to the shape of the wearer, e.g., conform to a human torso.

In general, RBSC is cheaper to produce than hot pressed or sintered SiC. Moreover, Si has a lower specific gravity than SiC; therefore, a RBSC composite containing some residual Si will have a lower specific gravity than monolithic SiC. Further, the specific gravity of RBSC is substantially less than that of alumina, a standard ceramic armor material. Accordingly, the economics and the prospect of reduced specific gravity provided sufficient incentive for the instant inventors to re-visit RBSC as a candidate armor material, and to try to engineer it to overcome its reported deficiencies as armor.

According to many who are skilled in the armor arts, what is sought in the way of an armor material is one that fractures and erodes the impacting projectile before it can penetrate the armor material. Viechnicki et al. (ibid.) have shown that all that is required in terms of hardness is for the armor to have at least the same hardness as the projectile, but that further increases in hardness over the required "threshold" level do not add significantly to the performance level.

RBSC is a composite material and as such its hardness is proportional to the volume fraction of hard phases such as SiC making up the composite material. In terms of developing a high-performing armor material, this first aspect of the instant invention focuses on achieving a sufficiently high volumetric loading of the hard ceramic phases such as SiC as to meet overall hardness levels believed to be important, and on limiting the size of the largest grains or crystals making up the composite body. Although sometimes referred to as a "fine-grained RBSC material", what is really meant is that the morphological features making up the material, or at least 90 volume percent of these grains or crystals, should not exceed about 100 microns in size. Particularly preferred is RBSC having at least 90 volume percent of its morphological features being no greater than about 55 microns in size. One technique for maximizing the amount of hard phase in the composite body is to produce a permeable mass or preform that is highly loaded volumetrically in the hard phases, typically in the form of filler materials having high hardness. Highly loaded preforms can be produced by utilizing a distribution of filler material particle sizes sufficiently wide so that small particles can nest or fit within the interstices of larger particles. Because these two parameters of maximizing the loading of hard fillers in the preform while capping or limiting the size of the largest particles inherently are at odds with one another, careful attention to processing parameters is required to achieve both in the same material. Fortunately, the instant inventors have been relatively successful in attaining preforms highly loaded in hard filler while limiting the size of the filler bodies in such a way that, for example, at least 90 percent by volume are smaller than about 100 microns in diameter. Even with this upper limit on the size of the largest particles, it is still possible to produce preforms that are 65 volume percent or more loaded in hard ceramic phases such as SiC.

Such an upper limit to the particle size of the filler materials used in the permeable mass or preform can be achieved, among other techniques, by sieving appropriately sized filler particles through a 170 mesh or 200 mesh (U.S. Standard) screen, which yields particles having a maximum size of about 90 microns and 75 microns, respectively.

Some of the bard ceramic fillers used in the Examples to follow have the following particle size distributions as-supplied: Grade F240 CRYSTOLON® SiC (Saint-Gobain/Norton Industrial Ceramics, Worcester, Mass.) has 90 percent by volume of all of its constituent particles being smaller than about 55 microns, and 97 percent smaller than about 70 microns. Grade F320 CRYSTOLON® SiC has 90 volume percent of its particles being smaller than about 37 microns, and 97 percent finer than about 49 microns. Grade F500 CRYSTOLON® SiC has 90 volume percent of its particles being smaller than about 17 microns, and 97 percent finer than about 25 microns. These results were calculated by a distributor of these raw material particulates based on the Eppendorf-Photosedimentometer.

It may be that the fine grain size specified by the instant invention is really a proxy for high mechanical strength. Because fine grain size is a necessary but not a sufficient condition for achieving high strength in brittle materials, achieving a high strength target traditionally has been taken as something of a metric for the quality of the ceramic or composite body produced. With composite materials in general and composite materials produced by infiltration in particular, a number of defects can seriously impair the mechanical strength of the resulting composite body. These include non-uniform filler. material distribution in the preform, incomplete infiltration of the preform, e.g., leaving porosity and/or unreacted carbon or other reactants in the preform, and excessive grain growth during thermal processing, either of the filler material or of the silicon carbide produced in situ. Such defects probably would also impair the anti-ballistic performance of the material.

On the other hand, if the fracture of the ceramic armor body resulting from a ballistic impact is dependent upon the size of the crystallites making up the armor body, perhaps the instant fined-grained RBSC's fracture in a different mode (e.g., transgranular versus intergranular, or vice-versa) than do RBSC's having larger microstructural features.

Whatever the exact reason or operative mechanism, the instant inventors have discovered that fine-grained RBSC materials are very effective at stopping ballistic projectiles.

Because the silicon carbide component of the reaction-formed ceramic bodies of the instant invention is so much harder than the silicon component (Vickers Hardness of about 2500 kg/mm$^2$ versus about 1100 kg/mm$^2$, respectively), the overall hardness of the reaction-formed body is strongly dependent upon the relative amounts of each phase. Thus, when the end-use article of the instant composite material is armor for protection against ballistic projectiles, it may be important that the composite body contain a large volume fraction of the hard phase(s), particularly where the residual infiltrant phase is softer than silicon, a scenario that will be discussed in more detail below. In a reaction-formed silicon carbide composite material, some silicon carbide is produced in situ. Thus, it is possible to form a composite body that is highly loaded in silicon carbide by infiltrating silicon into a permeable mass containing large amounts of carbon. For reasons that also will be discussed in more detail below, this approach is not preferred. Instead, what is desired is to reactively infiltrate a permeable mass or preform that is highly loaded not with carbon but rather with the hard ceramic phase(s) of the filler material(s).

Techniques for maximizing the volumetric loading of filler materials in the permeable mass or preform are well known, and usually take the form of blending a plurality of filler material bodies, for example, particles, having a distribution of sizes, in such a way that smaller particles tend to fill the interstices between larger particles. There are limits, however, to the extent of the distribution of particle sizes. For example, smaller particles tend to be more reactive than larger particles. At the other end of the scale, at some point, large-sized filler material particles will begin to reduce the strength of a composite body that fails by a brittle fracture mechanism due to the introduction of critical-sized flaws into the material. Further, whether it is strength-related or not, there are examples in the prior art of large or relatively large-grained RBSC bodies that were not superior armor materials.

Although most any of the known techniques may be employed to produce a permeable preform that can be infiltrated by a molten infiltrant comprising silicon, the techniques that seem to be better able at producing preforms that are highly loaded with one or more fillers are those that utilize a liquid phase, for example, sediment casting, slip casting or thixotropic casting.

Recently, it has become known to alloy the infiltrant metal used to make a reaction-formed silicon carbide body so that the metal phase of the formed body includes a constituent other than silicon. For example, the infiltrant may comprise an alloy of silicon and aluminum to yield a phase in the formed silicon carbide body comprising metallic aluminum or aluminum plus silicon. Such bodies containing an alloy infiltrant phase often are softer but tougher than similar bodies having essentially pure silicon as the infiltrant phase. In spite of the hardness reduction, such RBSC's having an alloyed infiltrant phase might still function well as armor materials. For example, the property of compressive strength may be an important factor contributing to good anti-ballistic character, particularly when combined with high hardness. The compressive strength of the composite body might be increased by introducing a ductile aspect to the mechanical failure mechanism.

Such "aluminum toughened" silicon carbide composite bodies have not been optimized for ballistic performance, but it appears that there may be some limit as to the extent of such alloying with softer but tougher metal, at least when the alloying element is aluminum. Aluminum is of course very soft, and where the infiltrant phase in a reaction-formed body containing 70 percent by volume of silicon carbide exceeds about 35 percent by volume of aluminum (balance silicon), the composite hardness falls below that of cemented tungsten carbide. Above about 70 percent aluminum in the infiltrant phase, the hardness drops below that of tool steel, suggesting that such armor might not be effective against even a tool steel projectile, such as that fired from small arms.

In a preferred embodiment, the permeable mass or preform contains one or more substantially inert filler materials. By this is meant a filler material that is substantially non-reactive with the molten infiltrant under the local processing conditions. One such filler material that is especially preferred is silicon carbide, as molten silicon more easily wets silicon carbide than other inert materials, such as oxides. However, it should be possible to admix at least some amount of other filler materials that may not be as wettable as silicon carbide under the local processing conditions and still achieve wetting and infiltration of the overall permeable mass by the molten silicon. Examples of such alternative filler materials include titanium diboride, titanium carbide, silicon nitride and aluminum nitride. It should even be possible to admix at least some amount of "non-wettable" filler materials (e.g., aluminum oxide) with "wettable" filler materials and still accomplish wetting and infiltration of the overall permeable mass by the molten silicon.

The filler material making up the permeable mass to be infiltrated may be provided in a number of different morphologies, including particulates, platelets, flakes, whiskers, short fibers, continuous fibers, microspheres, aggregate, etc. Particulates are often preferred for reasons of economy and availability.

It is possible to distinguish the silicon carbide matrix that is reaction-formed from the silicon carbide making up the reinforcement or filler material. Specifically, the reaction-formed silicon carbide typically is of the beta polymorph, at least under the instant processing conditions. In contrast, most commercially available silicon carbide, particularly the commodity grades, is the alpha form that is so commonly used as a filler material. Accordingly, analytical techniques known to those in the art can distinguish between the two forms and can provide at least approximate quantitative data as to the relative amounts of each that are present in the composite body.

A wide range of sizes of filler material bodies can be successfully infiltrated using the reaction-forming process, e.g., bodies ranging from several millimeters in size down to bodies on the order of a micron in size. Again, when the goal is to produce a body having attributes of a ballistic armor, the filler bodies should not be permitted to get much larger than about 100 microns in size.

In addition to keeping the starting size of the filler material relatively fine, the permeable mass of filler material should not be exposed to excessive temperatures, especially during infiltration. Here, "excessive" means temperatures at which grains can grow appreciably. For example, the transformation of silicon carbide from the beta to the alpha crystallographic form occurs at about 2050° C. The crystallographic transformation is often accompanied by extensive grain growth. Depending upon the exact conditions, it may be possible to heat to a slightly higher temperature (perhaps about 2100° C.) and still avoid this recrystallization. Still, it would be advisable not to conduct the infiltration, or post-process the infiltrated mass, at temperatures in excess of about 2000° C.

Moreover, the infiltrant should not undergo excessive reaction as it infiltrates the permeable mass or preform. For example, the permeable mass to be infiltrated often contains free or elemental carbon as the carbon source to form the in-situ silicon carbide. The amount of this free carbon should be limited to (generally) no more than about 10 percent by volume of the permeable mass, and preferably, no more than about 5 or 6 percent. Thus, in general, the amount of silicon carbide produced in-situ should be limited to no more than about 24 volume percent of the final composite body. Among the problems that result from excessive reaction during the infiltration process are temperature spikes due to the exothermic nature of the chemical reaction of silicon and carbon. Such temperature spikes can cause cracking due to localized thermal expansion. In addition, the conversion of elemental carbon to silicon carbide entails a volumetric expansion of about 2.35 times. Thus, large amounts of reaction are also detrimental from the standpoint that the large volumetric change may cause cracking.

Although not required, the carbon source added to the permeable mass or preform usually takes the form of elemental carbon, such as graphite. For many applications, particularly those requiring high stiffness, it is desirable that the silicon carbide of the resulting composite body be at least partially interconnected. This outcome is more readily achieved if the carbon in the permeable mass or preform is interconnected. Further, interconnected carbon in the permeable mass or preform assists the infiltration process in terms of speed and reliability. At the same time, excessive amounts of carbon in the permeable mass or preform do not appear to benefit the infiltration process and may even be detrimental in terms of being able to produce a strong, crack-free silicon carbide composite body. In a preferred embodiment, the carbon is introduced to the permeable mass as a resin. This mixture may then be molded to the desired shape. Curing the resin renders the permeable mass self-supporting, e.g., as a preform. During subsequent thermal processing, or during an intervening firing step, typically in a non-oxidizing atmosphere, the resin pyrolyzes to carbon in interconnected form to yield a preform containing at least about 1 percent by volume of carbon. The resin infiltration and pyrolysis cycle may be repeated one or more times if an increase in the carbon content is desired.

In accordance with a second major aspect of the instant invention, ceramic fibers are adhered to the back face, i.e., opposite to the front or strike face of a ceramic armor using silicon infiltration technology. In particular, it has been unexpectedly discovered that silicon carbide fibers fused to the back of a silicon carbide armor body enhances the ballistic performance of the armor body. Silicon carbide fibers can be joined readily to SiC-based armor plates by siliconizing or reaction bonding techniques. In fact, a preferred ceramic plate is one made by reaction-bonding, as discussed above. A preferred fiber is SiC made by reactively infiltrating carbon fiber with silicon-containing infiltrant. Particularly preferred is forming a dense ceramic body and SiC fiber, and joining the two, all in a single step. Specifically, carbon fibers, woven or nonwoven, are contacted to the back face of a permeable mass or preform containing at least some carbon. A source of silicon is contacted to an exposed portion of the fibers. Molten silicon is readily wicked into the mass of fibers, and from there into the permeable mass or preform. The carbon fibers are chemically converted to SiC fibers, and the carbon in the preform is chemically converted to SiC, thereby forming a RBSC ceramic body. Concurrently, the formed SiC fibers are bonded to the RBSC body as a by-product of the Si infiltration process.

The ceramic fiber making up the rear surface of the silicon carbide armor body may be most any that can be adequately bonded as to result in an enhancement in ballistic performance. The fiber may be discontinuous or in chopped form, but long fibers, e.g., continuous fibers may provide better ballistic performance than shorter fibers. Preferably, the fibers are arranged such that the fiber axes lie within or close to a plane, and even more preferably that the fiber properties are equiaxial within the plane of the backing layer. However, the fibers may be nonwoven, e.g., randomly arranged in a mat, arranged as alternating layers of uniaxial fibers, arranged in the form of a felt, or woven by any of a variety of weaves to form a fabric. The term "cloth", as used in this disclosure, will be understood to include both woven and nonwoven fibers.

It may be possible to include some non-SiC fibers among those making up the backing layer. As the instant invention contemplates using siliconizing or reaction-bonding technology to bond the fibers to the back of the armor tile, at least some of the fibers are expected ultimately to comprise silicon carbide. In one embodiment, the fibers comprise silicon carbide in the as-supplied condition. In another embodiment, the fibers as supplied comprise carbon, and are chemically converted to silicon carbide during exposure to molten silicon.

Fibers comprising silicon carbide, or a cloth produced from such fibers, may be joined to a silicon-containing ceramic surface by siliconizing. Specifically, it is well known that molten silicon wets silicon-containing ceramics such as silicon carbide or silicon nitride, although temperatures substantially above the melting point of silicon may be required, for example, perhaps around 1700° C. to 2100° C. As pointed out earlier, however, temperatures on the order of 2100° C. and above should be avoided if at all possible because of the potential for grain growth (e.g., via recrystallization of silicon carbide). The atmosphere should be non-oxidizing. Inert atmospheres such as argon are sufficient, with vacuum atmospheres preferred. Here, nitrogen would be an oxidizing atmosphere, at least in the broader sense of the term "oxidizing", i.e., transfer of electrons. More exactly, nitrogen gas would be expected to react with molten silicon to produce silicon nitride, which may or may not be helpful in the context of the instant invention.

To bond a cloth comprising silicon carbide fibers to a silicon-containing ceramic body, e.g., a SiC or $Si_3N_4$-containing body, the cloth is contacted to at least one surface of the body. The cloth and body are heated to the processing temperature under non-oxidizing conditions. The cloth, the body, or both is contacted to a source of molten silicon or silicon-containing alloy. Preferably, silicon in solid form (e.g., powder, lump, ingot, etc.) is pre-positioned in contact with the cloth at ambient temperature, and then the body, cloth and silicon are heated as a unit to the processing temperature. The molten silicon infiltrates at least the smaller voids or pores between the fibers as well as those pores or voids between the fibers of the cloth and the silicon-containing ceramic body. Upon cooling and solidification of the silicon, the cloth is bonded to the silicon-containing ceramic body by the infiltrated silicon in the cloth, which forms a metallurgical bond to the silicon-containing ceramic body.

In another embodiment, the cloth may comprise a precursor to silicon carbide such as carbon. This embodiment is useful at least from a processing standpoint because the chemical reaction assists in the infiltration process. Consequently, the process may be conducted reliably at lower temperatures than in those situations where substantially no reaction occurs. Specifically, with carbon available to react, infiltration of molten silicon can be carried out at temperatures as low as about 1450° C. depending on the amount and contiguity of the carbon. In contrast, when the infiltration is one of siliconizing, i.e., little or no free carbon available for reaction, higher temperatures are usually required for the infiltration to proceed.

The ceramic armor body may be made from any material that can be wet by molten silicon without producing deleterious chemical reactions. As mentioned above, such ceramic materials include silicon carbide. A particularly preferred silicon carbide body is one made by reaction-forming. The instant invention is also expected to work in conjunction with silicon carbide bodies made by other processes, such as sintering or hot pressing. Other ceramic bodies that should be amenable to joining to fibers comprising silicon carbide by means of a silicon bond include ceramic bodies comprising boron carbide and/or silicon nitride.

In a preferred embodiment, the production of the silicon carbide body and the bonding of the silicon carbide fibers to the back face of the body are conducted in a single thermal processing. In particular, the silicon carbide armor body is provided as a permeable mass or preform containing at least some carbon. The cloth comprising silicon carbide and/or carbon is contacted to at least one surface of the permeable mass or preform. A source of the silicon infiltrant is contacted to the cloth or permeable mass/preform or both to form a unit. The unit is heated to at least about 1450° C. under vacuum or inert atmosphere. The silicon infiltrant is molten at this temperature and infiltrates the interconnected porosity in the permeable mass or preform, as well as the pores or voids between the fibers making up the cloth. Concurrently, the silicon reacts with the carbon in the permeable mass or preform, and with any that may be in the cloth to form silicon carbide. As a continuous pathway of silicon exists from the infiltrated preform to the infiltrated cloth, solidification of the silicon bonds one to the other.

In general, the economics of reaction bonding for making silicon carbide bodies are more favorable than are those of hot pressing. Not only may a plurality of RBSC bodies be thermally processed simultaneously, but also the tooling (typically graphite) lasts longer than that used in hot pressing operations. Further, RBSC processing requires neither high pressures nor temperatures as high as required for hot pressing.

As mentioned previously, the RBSC composite materials can be produced to net size and shape better than hot pressed or sintered ceramic armor bodies, as expressed or measured by the achievement of precise net dimensional tolerances. In high volume production in particular, a curved ceramic armor plate measuring about 12×9×0.18 inch (30×23×0.46 cm) made of RBSC material typically can be made to a three-sigma (three standard deviations) value for thickness of about 10 to 12 mils (250 to 300 microns). Normalized to the mean thickness, this three-sigma reproducibility value works out to about 5.4 to 6.5 percent. In contrast, a hot-pressed boron carbide curved tile having substantially the same length and width dimensions but being slightly thicker at about 0.27 inch (0.69 cm) typically exhibits a three-sigma thickness value of about 30 mils (760 microns), or about 11 percent. Thus, in a third important aspect of the instant invention, this potential of RBSC to produce highly dimensionally accurate shaped articles is put to use in the production of armor.

The ability to maintain tight dimensional tolerances, particularly on the thickness dimension, is very important in armor applications. Typically, production armor, especially armor for weight-sensitive applications, is warranted or certified to some minimum ballistic protection level as measured by a $V_{50}$ projectile velocity number at a specified maximum weight or areal density. (As a point of information, the ballistic test terminology in this patent document has the same meaning as the same terminology found in MIL-STD-662F.) Because the objective is high ballistic performance and low areal density, both of which parameters are related to thickness but varying oppositely of one another, one wants as uniform a thickness of the armor plate as possible. To more precisely illustrate the issue, the $V_{50}$ specification must be achieved at the lower limit of the permissible thickness range, i.e., the thinnest permissible plate or region thereof, whereas excessively thick plates may exceed the maximum permitted weight.

As long as the overall shape of a ceramic armor plate is within specifications, it is at least theoretically possible to restore non-uniformities developed during thermal processing by means of grinding or machining. Such post-processing operations, however, are usually expensive and rarely are they commercially viable in the body armor market. Accordingly, the ceramic armor body should have uniform thickness in the as-thermally processed condition.

Conformity of the shape of the formed ceramic armor body to the intended shape is also important. The ability to make ceramic armor plates having complex shaped curves that faithfully reproduce the desired shape can have significant value in meeting the form and fit requirements of the armor product. The instant RBSC materials, exhibiting better thickness uniformity than sintered or hot pressed armor ceramics, are also expected to exhibit better shape fidelity than the sintered or hot pressed product.

The following non-limiting examples further illustrate the instant invention.

EXAMPLE 1

This example demonstrates, among other important features of the instant invention, the fabrication of a silicon carbide composite armor plate highly loaded in a fine-grained silicon carbide filler.

An armor "breastplate" and four "feeder rail" preforms were prepared by a sedimentation casting process. Specifically, about 24 parts of de-ionized water were added to 100 parts of CRYSTOLON green silicon carbide (Saint-Gobain/Norton Industrial Ceramics, Worcester, Mass.) and about 6 parts of KRYSTAR 300 crystalline fructose (A.E. Staley Manufacturing Co., Decatur, Ill.) to make a slurry. The silicon carbide particulate consisted of about 65 parts by weight of Grade F320 (median particle size of about 29 microns, blocky morphology) and the balance Grade 500 RG (median particle size of about 13 microns, rounded morphology). The solids and liquids were added to a plastic jar and roll mixed for about 40 hours. The slurry was de-aired in about 760 mm of vacuum for about 5 minutes. About 15 minutes prior to casting, the slurry was re-roll mixed to suspend any settled particulates.

A graphite support plate was placed onto a vibration table. A rubber mold having a cavity of the desired shape to be cast was wetted with a surfactant consisting of a 10 weight percent aqueous solution of JOY dishwashing detergent (Proctor and Gamble, Cincinnati, Ohio). The wetted rubber mold was then placed onto the graphite plate and the surfactant was allowed to dry. The slurry was poured into the cavity. Vibration was commenced.

After the particulates had fully settled (about 3 hours), vibration was halted. The residual liquid on the top of the casting was blotted up with a sponge. The graphite plate and the castings in the rubber mold thereon were transferred from the vibration table to a freezer maintained at a temperature of about minus 15° C.

Once the casting had frozen thoroughly, the rubber mold was removed from the freezer and the frozen casting contained therein was demolded and placed onto a graphite setter tray for drying and bisque firing. For the breastplate preforms, a special setter tray was provided, this specific setter tray being contoured to the shape of the outer face of the breastplate preform. The graphite trays and preforms were then placed into a nitrogen atmosphere furnace at ambient temperature. The furnace was energized and programmed to heat to a temperature of about 90° C. at a rate of about 40° C. per hour, then to hold at about 90° C. for about 2 hours, then to further heat to a temperature of about 600° C. at a rate of about 100° C. per hour, to hold at about 600° C. for about 2 hours, then to cool down to about ambient temperature at a rate of about 200° C. per hour. This firing operation pyrolyzed the fructose, yielding a well-bonded preform containing about 2 percent by weight carbon.

The carbon content of the breastplate preform was increased by re-infiltrating with a 70 percent by weight aqueous solution of KRYSTAR 300 crystalline fructose. Specifically, the preform was submerged in the fructose solution for a total of about 20 hours. For about the first 2 hours, an overpressure of about 60 psi (410 kPa) of air was applied to the solution in an effort to force the solution into the preform more quickly. After halting the pressure application for about 15 minutes, it was resumed at the same pressure. After maintaining the overpressure for about another 2 hours, the pressure was let back to ambient and the preform was permitted to soak in the solution for the balance of the 20 hours. The breastplate preform was then removed from the fructose solution and wiped with a damp cloth to remove excess fructose solution. The preform was then re-pyrolyzed according to the same thermal schedule as described above. The second pyrolysis step added about 3 percent to the overall ass of the preform.

Figure 2:
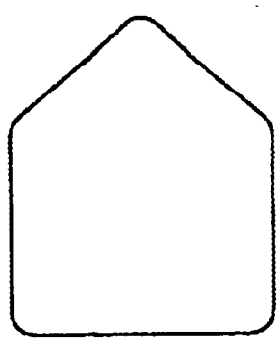
FIG. 2 is a cross-sectional view of a feeder rail as described in Example 1.

The breastplate preform had a mass of about 700 grams and had overall dimensions of about 318 mm long by about 241 mm wide by about 4.4 mm thick. The breastplate was slightly curved in the length and width dimensions. The approximate shape of the breastplate is shown in FIG. 1. Each rail preform had a cross-section as depicted in FIG. 2 and measured about 220 mm long by about 15 mm wide by about 25 mm thick. During infiltration of the breastplate preforms, these rails would serve as a conduit for conducting molten infiltrant toward and into the armor breastplate preform.

A lay-up for infiltration was then prepared.

Figure 3A:
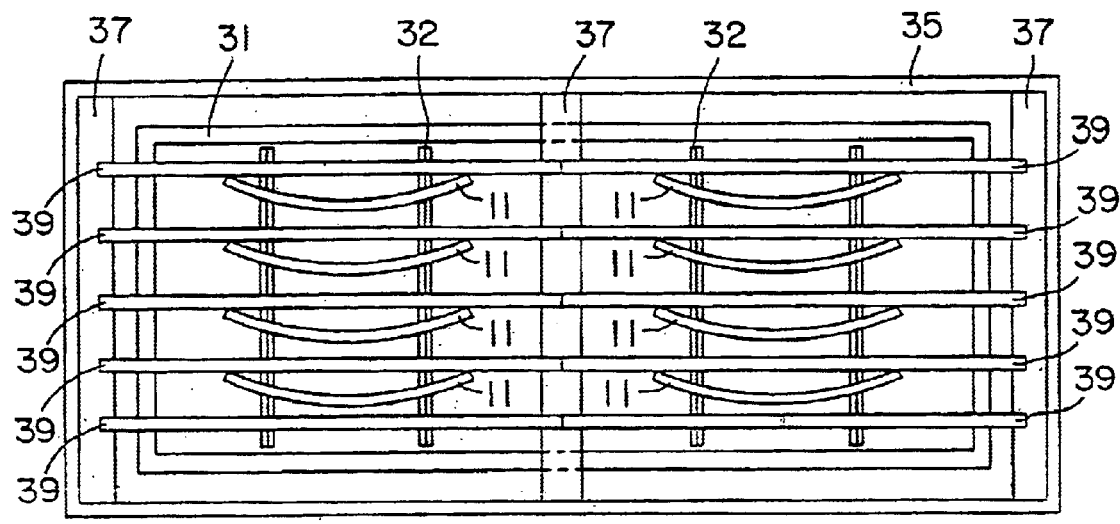
FIGS. 3A and 3B are top and front views, respectively, of a set-up used to prepare silicon carbide composite breastplates according to Examples 1 and 2.
Figure 3B:
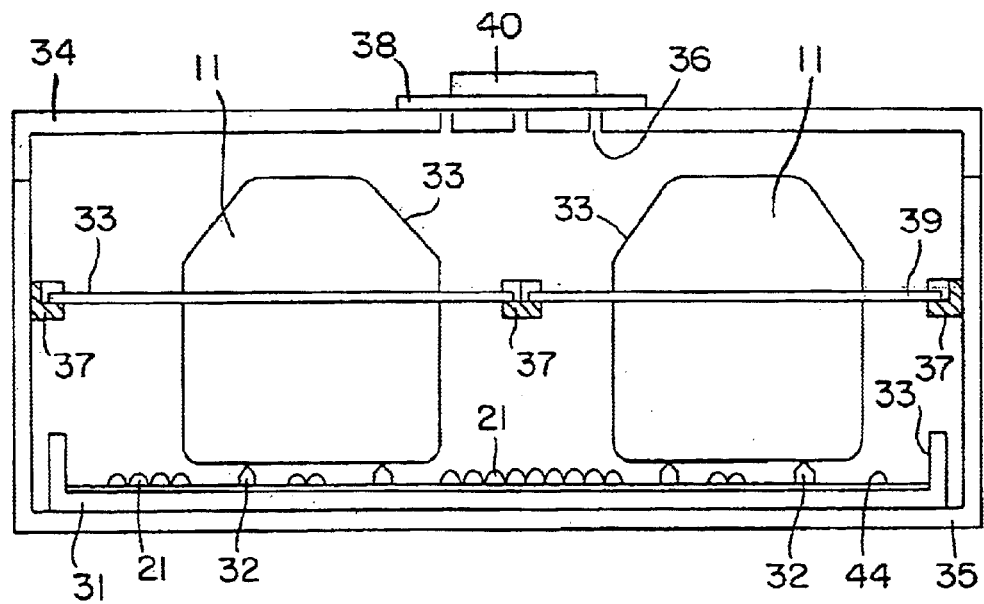

Referring to FIGS. 3A and 3B, the interior surfaces of a Grade ATJ graphite tray 31 (Union Carbide Corp., Carbon Products Div., Cleveland, Ohio) measuring about 790 mm by about 230 mm by about 51 mm deep was spray coated with a boron nitride slurry or paint 33 using a Model 95 Binks spray gun. The boron nitride paint was prepared by diluting about 1800 grams of LUBRICOAT boron nitride paste (ZYP Coatings, Oak Ridge, Tenn.) with deionized water to a volume of about 1 gallon (3.7 liters). Two relatively light coats of this boron nitride paint were applied, with air-drying between coats (20 minutes minimum at 150° C.).

The boron nitride-coated tray was then placed into a larger graphite chamber 35 measuring just slightly larger lengthwise and widthwise than the tray, but being of sufficient height to accommodate the long dimension of the armor breastplate. The chamber also featured means 37 for supporting a parallel array of graphite dowel rods 39.

Infiltration of the Carbon Cloth and Silicon Carbide Feeder Rails Referring now specifically to FIG. 3B, a single PANEX® 30 low oxidation carbon cloth 44 (Grade PWO3, plain weave, 115 g/m², Zoltek Corp., St. Louis, Mo.) weighing about 25 grams and measuring about 790 mm by about 230 mm was placed on the floor of the coated graphite tray 31,33. Four silicon carbide rail preforms 32, each having a mass of about 190 grams, were placed across the width of the cloth 44, and arranged in pairs, one pair on each half of the tray. Silicon (Grade LP, Elkem Metals Co., Pittsburgh, Pa., lump form) comprising by weight about 0.5 percent Fe (max) and the balance Si, was spread over the surface of the carbon cloth in a sufficient amount to ensure complete infiltration of the cloth, rails and any preform resting on the rails. The top of the chamber was covered with a loose-fitting (non-hermetically sealing) graphite lid 34 featuring a number of 1 cm diameter through-holes 36 to permit atmosphere exchange. The holes were covered with a piece of graphite felt 38 which was held in place with a graphite block 40 which served as a dead load, thereby completing the lay-up.

The completed lay-up was then placed into a vacuum furnace at about ambient temperature (e.g., about 20° C.). The air was evacuated using a mechanical roughing pump, and a rough vacuum of less than about 100 millitorr residual pressure was thereafter maintained. The lay-up was then heated from ambient temperature to a temperature of about 1350° C. at a rate of about 200° C. per hour. After maintaining a temperature of about 1350° C. for about 1 hour, the temperature was further increased to a temperature of about 1550° C. at a rate of about 200° C. per hour. After maintaining a temperature of about 1550° C. for about 1.5 hours, the temperature was decreased to a temperature of about 1450° C. at a rate of about 100° C. per hour. Without holding at this temperature, the lay-up temperature was further decreased to a temperature of about 1300° C. at a rate of about 25° C. per hour, which was immediately followed by a cooling at a rate of about 200° C. per hour to approximately ambient temperature.

Following this heating schedule, the chamber and its contents were recovered from the vacuum furnace. The silicon infiltrant had melted and infiltrated through the carbon cloth and the rail preforms, thereby converting the carbon cloth to silicon carbide cloth, and forming dense, silicon carbide composite feeder rails. From gravimetric analysis, it was determined that there was about 770 grams of uninfiltrated silicon remaining pooled on the silicon carbide cloth. The contents of the graphite chamber were then re-used to fabricate silicon carbide composite armor breastplates.

Infiltration of Breastplate Preforms

About another 1775 grams of silicon 21 (Grade LP, Elkem Metals Co., Pittsburgh, Pa.) and comprising by weight about 0.5 percent Fe (max) and the balance Si, was distributed on the silicon carbide fabric between the silicon carbide composite (e.g., infiltrated) rails. Graphite dowel rods 39 measuring about 0.25 inch (6 mm) in diameter and spray coated with boron nitride paint 33 as described above were placed into graphite holders or supports 37. Four breastplate preforms 11 similarly spray coated with boron nitride 33 were placed across the two rails edgewise in each half of the tray (see FIG. 3A). The surface of each preform contacting the rails was left uncoated. The top of the chamber was covered as previously described to complete the lay-up.

The graphite chamber and its contents were then thermally processed in substantially the same manner as was used to infiltrate the carbon cloth and silicon carbide feeder rail preforms.

Following this heating schedule, the graphite chamber and its contents was recovered from the vacuum furnace and disassembled. The silicon infiltrant had melted, infiltrated through the composite feeder rails and into the armor breastplate preforms to form dense, silicon carbide composite breastplates. Because each breastplate was supported by the rails in line contact on its width dimension, only light hand-applied force was required to separate the formed breastplate composite bodies from the feeder rails. Only a light sandblasting was required to remove several nodules of silicon infiltrant that had exuded through certain points in the boron nitride coating on the breastplates.

EXAMPLE 2

Eight silicon carbide composite armor breastplates were formed in substantially the same manner as in Example 1, with the following exceptions. First, about 22 parts by weight of deionized water was added to about 6 parts of KRYSTAR crystalline fructose (A.E. Staley Mfg. Co.) and about 100 parts of CRYSTOLON green silicon carbide particulate (Saint-Gobain/Norton Industrial Ceramics, Worcester, Mass.). Second, the silicon carbide particulate consisted by weight of about 60 percent Grade F240 (median particle size of about 45 microns, blocky morphology) and the balance Grade 500 RG (median particle size of about 13 microns, rounded morphology).

EXAMPLE 3

Silicon carbide armor breastplates were produced substantially in accordance with Example 2, with the following notable exceptions. First, the back-soaking of fructose solution into the pyrolyzed breastplate preforms was modified somewhat. More exactly, the aqueous solution was about 80 percent by weight of KRYSTAR® crystalline fructose (A.E. Staley Mfg. Co.), and the breastplate preforms were immersed in this solution for a minimum of about 3 hours at ambient pressure only, i.e., with no application of pressure or vacuum to accelerate the back-soaking. Second, the breastplate preforms were not coated with boron nitride. Third, the breastplate preforms were infiltrated with the length dimension instead of the width dimension of the preform in contact with the feeder rails.

EXAMPLE 4

This example demonstrates the bonding of a silicon carbide cloth to a silicon-bearing ceramic body. This example furthermore demonstrates the production of a reaction-bonded SiC composite body suitable for armor applications.

Preforms were prepared by a sedimentation casting process. Specifically, about 25 parts of liquid were added to 100 parts of CRYSTOLON green silicon carbide (St. Gobain/Norton Industrial Ceramics, Worcester, Mass.) having the rounded particle morphology and 8 to 12 parts of KRYSTAR 300 crystalline fructose (A.E. Staley Manufacturing Co., Decatur, Ill.) to make a slurry. The silicon carbide particulate content consisted of about 90 percent having a median particle size of about 13 microns (Grade 500 Round) and the balance having a median particle size of about 6.5 microns (Grade 800 Round). The solids and liquids were added to a plastic jar and roll mixed for about 40 hours. The slurry was de-aired in about 760 mm of vacuum for about 5 minutes. About 15 minutes prior to casting, the slurry was re-roll mixed to suspend any settled particulates.

A graphite support plate was placed onto a vibration table. A rubber mold having a cavity of the desired shape to be cast was wetted with a surfactant (Sil-Clean, Plastic Tooling Supply Co., Exton, Pa.). The wetted rubber mold was then placed onto the graphite plate and the surfactant was allowed to dry. The slurry was poured into the cavity. Vibration was commenced.

After the particulates had fully settled (about 3 hours), vibration was halted. The residual liquid on the top of the casting was blotted up with a sponge. The graphite plate and the castings in the rubber mold thereon were transferred from the vibration table to a freezer maintained at a temperature of about negative 15° C. The casting was thoroughly frozen in about 6 hours.

From the freezer, the frozen casting was demolded and placed onto a graphite setter tray for drying and bisque firing. The graphite tray and preform were then immediately placed into a nitrogen atmosphere furnace at ambient temperature. The furnace was energized and programmed to heat to a temperature of about 40° C. over a period of about one-half hour, to hold at about 40° C. for about 2 hours, then to heat to a temperature of about 650° C. over a period of about 5 hours, to hold at about 650° C. for about 2 hours, then to cool down to about ambient temperature over a period of about 5 hours. The bisque fired preform was removed from the furnace and stored until the infiltration step. This firing operation pyrolyzed the fructose, yielding a well-bonded preform containing about 2 to 3 percent by weight carbon.

Next, a lay-up to confine the infiltration process was prepared.

Figure 4A:
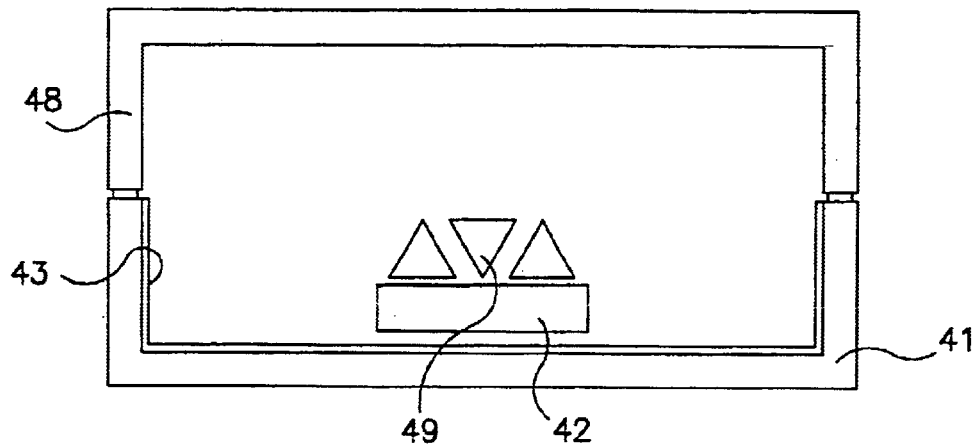
FIGS. 4A and 4B are side views of two embodiments of set-ups used to prepare the SiC fiber-backed silicon carbide composite tiles of Example 4.
Figure 4B:
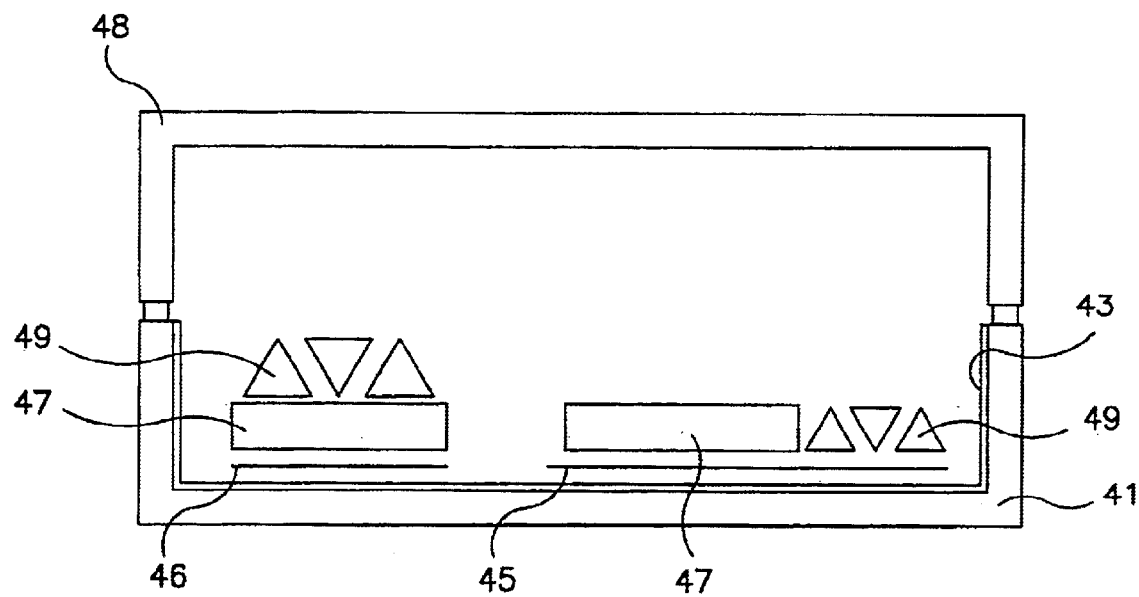

Referring to FIGS. 4A and 4B, the interior surfaces of a Grade ATJ graphite boat 41 (Union Carbide Corp., Carbon Products Div., Cleveland, Ohio) measuring about 375 mm by about 298 mm by about 51 mm deep was coated with a boron nitride slurry or paint 43 at a rate or thickness of about 3 mg per square centimeter. The boron nitride paint was prepared by mixing four parts by weight of LUBRICOAT boron nitride paste (ZYP Coatings, Oak Ridge, Tenn.) with three parts water and then spray coating using a Model 95 Binks spray gun. The boron nitride coating was then dried, optionally with slight heating to accelerate the removal of water.

Referring now specifically to FIG. 4B, a single PANEX® 30 low oxidation carbon cloth 45 (Grade PWO3, plain weave, 115 g/m², Zoltek Corp., St. Louis, Mo.) weighing about 5.2 grams and measuring about 200 mm by about 230 mm was placed on the floor of the coated graphite boat 41, 43. Two preform tiles 47, each measuring about 100 mm square by about 4.2 mm thick, and having a mass of about 92 grams each, were placed onto the cloth, close to one 200 mm long edge of the cloth, with a square face of each tile contacting the cloth.

About 100 grams of silicon in lump form 49 (Elkem Metals Co., Pittsburgh, Pa.) and comprising by weight about 0.5 percent Fe (max) and the balance Si, was approximately evenly distributed over the exposed area of the carbon cloth. The top of the boat was covered with a loose-fitting (non-hermetically sealing) graphite lid 48 to complete the lay-up.

The completed lay-up was then placed into a vacuum furnace at about ambient temperature (e.g., about 20° C.). The air was evacuated using a mechanical roughing pump, and a rough vacuum of less than about 100 millitorr residual pressure was thereafter maintained. The lay-up was then heated from ambient temperature to a temperature of about 1350° C. at a rate of about 200° C. per hour. After maintaining a temperature of about 1350° C. for about 1 hour, the temperature was further increased to a temperature of about 1550° C. at a rate of about 200° C. per hour. After maintaining a temperature of about 1550° C. for about 1 hour, the temperature was decreased to a temperature of about 1450° C. at a rate of about 100° C. per hour. Without holding at this temperature, the lay-up temperature was further decreased to a temperature of about 1300° C. at a rate of about 25° C. per hour, which was immediately followed by a cooling at a rate of about 200° C. per hour to approximately ambient temperature.

The furnace atmosphere was brought back to ambient pressure and the lay-up was removed from the furnace. Disassembly of the lay-up revealed that silicon had fully infiltrated the carbon cloth and the preform. Further, the silicon had reacted with the carbon in the preform and that making up the cloth to form silicon carbide. Thus, this reactive infiltration had formed a silicon carbide cloth and a composite body comprising silicon carbide and silicon, with the cloth being bonded to the composite body.

EXAMPLE 5

The procedure of Example 4 was substantially repeated, except that the carbon cloth 46 was cut just slightly larger than a single 100 mm square, 92 gram preform 47, and about 48 grams of silicon (Elkem Metals Co.) in lump form 49 was placed on top of the preform. A reaction-bonded silicon carbide composite body having adhered to it a reaction-bonded silicon carbide cloth was again formed.

EXAMPLE 6

The procedure of Example 5 was repeated, except that each preform was about 4.6 mm thick and had a mass of about 100 grams. No carbon cloth was used. Referring specifically to FIG. 4A, silicon in lump form 49 was placed on top of each preform 42; this silicon had a mass of about 44 grams. At the conclusion of thermal processing, a reaction-bonded silicon carbide composite body was again produced. The formed body had a bulk density of about 3.00 g/cc.

EXAMPLE 7

This Example demonstrates the ballistic performance of a silicon carbide composite body featuring a fibrous silicon carbide layer adhered to the rear face of the composite body.

A number of targets for ballistic testing were prepared. Specifically, the ceramic component of the target consisted of a reaction-bonded silicon carbide composite tile produced substantially in accordance with Examples 4 and 5. This tile measured about 4 inches (100 mm) square by about 0.180 inch (4.6 mm) thick, which included an approximately 0.020 inch (0.5 mm) thick layer of silicon carbide cloth which was reaction-bonded to the back of the tile. Each tile was attached to the center of a SpectraShield® fiber-reinforced plastic backing (AlliedSignal Inc., Morristown, N.J.) measuring about 23 cm by about 20 cm with two plies of double-sided adhesive film to form a ballistic test coupon having an areal density of about 4 pounds per square foot (about 20 kg per square meter). The surface featuring the silicon carbide cloth contacted the SpectraShield® backing. For testing, this ballistic test coupon was then placed in front of 23 plies of a reinforced plastic sheet material comprising KM2 (850 denier) fabric in a nylon matrix, thereby completing the target. The reinforced plastic sheets had a collective density of 1.2 pounds per square foot (5.9 kg per square meter). A block of modeling clay was placed directly behind each target to record the displacement of the target during impact.

The basic unit of ballistic penetration resistance used in this testing is the $V_{50}$, the velocity of the projectile at which partial penetration and complete penetration of the target are equally likely.

The targets were shot at varying velocities with a 7.62 mm ball projectile. The $V_{50}$ was found to be 2649 ft/s (807.4 n/s), with a velocity spread of 72 ft/s (22 m/s). This ballistic performance compares favorably to that of hot pressed silicon carbide armor.

COMPARATIVE EXAMPLE 7

Targets were prepared in the same manner as the above-mentioned targets, except that the silicon carbide composite tiles of Example 6 were used. The $V_{50}$ (with a 74 ft/s velocity spread) for these tiles that did not have a silicon carbide cloth backing was 2512 ft/s (765.7 m/s), with a velocity spread of 74 ft/s (23 m/s).

EXAMPLE 8

This Example further demonstrates the efficacy of a SiC cloth backing to a ceramic armor tile.

Candidate ceramic armor materials were provided in the form of square tiles measuring about 100 mm on a side. Some tiles were of substantially the same composition as the silicon carbide breastplates of Example 1, and are here termed "Composition A".

Other tiles were of substantially the Example 2 composition, and are here referred to as "Composition B".

Composition A consisted of about 80 percent by volume of silicon carbide, balance silicon. Its bulk density as measured by the immersion technique was about 3.0 g/cc, and its Young's Modulus as measured by the sonic technique was about 360 GPa. Further, a RBSC body very similar in composition and processing to Composition A had a four-point flexural strength as measured by ASTM Procedure No. D790 of about 280 MPa.

The threat was the same in each case. The areal density of the FRP backing layer was kept substantially the same at about 7.11 kg/m$^2$. Except for the last listing for the Composition "A" material, where the backing material comprised 65 plies of SpectraShield® fiber reinforced plastic, the backing material consisted of 30 plies of KM2 fabric reinforced with PVB polymer.

Normalizing the $V_{50}$ with respect to the total areal density yields a parameter referred to in this disclosure as "ballistic stopping power". This parameter is reported in the right-hand-most column of the Tables.

TABLE I

| Material | Ceramic Areal Dens. (kg/m$^2$) | SiC Cloth Layer? | Calc. $V_{50}$ (m/s) | $V_{50}$ per Unit Total Areal Density (m$^3$/kg/s) |
|---|---|---|---|---|
| RBSC Composition "A" | 22.10 | no | 691.2 | 23.66 |
| RBSC Composition "A" | 21.72 | yes | 709.3 | 24.60 |
| RBSC Composition "A" | 22.10 | yes | 915.3 | 31.34 |
| RBSC Composition "A" | 22.10 | yes | 850.1 | 29.10 |
| RBSC Composition "B" | 21.72 | no | 774.8 | 26.87 |
| RBSC Composition "B" | 21.72 | no | 806.8 | 27.98 |
| RBSC Composition "B" | 21.72 | yes | 809.6 | 28.08 |

Table I reports the ballistic stopping power of armor assemblies for the two compositions of the instant invention as a function of the presence of the SiC cloth layer on the back surface of the armor tile. Due to a smaller number of tests in this example compared to the ballistic testing described below in Example 9, all test data are reported. The SiC cloth layer seems to provide a clear improvement for the A composition, but not a clear improvement for the B Composition.

EXAMPLE 9

This example illustrates the inherently good ballistic-resistant qualities of the instant silicon carbide composite materials themselves without any fibrous silicon carbide adhered to the rear surface of a plate of such material. This example furthermore compares this ballistic performance to a high performance (but high cost) ceramic armor such as hot pressed boron carbide.

To produce an appropriate target for ballistic testing, the ceramic tile was attached to a SpectraShield® polymer composite backing layer (AlliedSignal Inc., Morristown, N.J.). This backing layer material was supplied as a 54 inch (1370 mm) wide roll consisting of 2 plies of unidirectional fibers embedded in a resin matrix, with the fibers of one ply being orthogonal to the fibers of the other ply. A number of 12-inch (305 mm) wide sheets were cut from the roll. The appropriate number of these sheets were then laminated and consolidated in an autoclave at an applied pressure of about 150 psi (1.3 MPa) at a temperature of about 121° C. for about 60 minutes, thereby forming a rigid polymer composite plate. Following consolidation, a backing plate measuring about 12 inches (305 mm) square was cut from the 54 by 12 inches (1370 by 305 mm) plate using a band saw or water jet. An approximately 5 inch (120 mm) square region in the center of the backing plate was lightly abraded using 120 grit sandpaper. After cleaning the surfaces to be bonded with isopropyl alcohol, a candidate ceramic armor tile measuring about 100 mm square was bonded to the center of the backing plate using two plies of urethane film adhesive, each film being about 76 microns thick. The bond was cured under full vacuum in an oven maintained at a temperature of about 121° C. for about 30 minutes, thereby forming a ballistic test coupon.

The areal density of the backing plate was varied according to the number of laminates used; the areal density of the ceramic tile was varied according to the thickness dimension to which the ceramic tile was ground. In each instance, however, the total areal density (ceramic tile plus backing material) was maintained at roughly the same amount.

A target for ballistic testing was assembled as follows: The ballistic test coupon was placed in front of 28 plies of KM2 (600 denier) blanket with rip-stop nylon and camouflage cordura covers to simulate the outer tactical vest (OTV) of a wearable body armor system, e.g., a soft body armor garment. The OTV simulant and test coupon were placed in front of a 100 mm thick block of Roma Plastiline modeling clay that had been conditioned at a temperature of about 35° C. for about 6 hours. The test coupon and OTV simulant were secured to the clay block with duct tape, and the clay block was backed up by a steel support structure that was secured to the test table, thereby completing the target.

The targets were shot at zero degrees obliquity using two different types of 7.62 mm projectiles at varying velocities. Table II shows the comparative ballistic test results against the first threat; Table III reports the results against the other threat, which was the same projectile as was used to generate the ballistic data reported in Table I. Each candidate armor material was tested several times to determine the best weight ratio of ceramic-to-backing layer material. Thus, unlike the data reported in Table I, here only the performance values for the optimized ratios are reported, i.e., the best results for each ceramic tile composition.

TABLE II

| Material | Ceramic Areal Dens. (kg/m$^2$) | Backing Areal Dens. (kg/m$^2$) | Calc. $V_{50}$ (m/s) | $V_{50}$ per Unit Total Areal Density (m$^3$/kg/s) |
|---|---|---|---|---|
| RBSC Composition "A" | 11.48 | 11.83 | 920.2 | 39.5 |
| RBSC Composition "B" | 13.98 | 9.48 | 951.0 | 40.5 |
| Hot Pressed B$_4$C | 16.62 | 5.913 | 996.7 | 44.2 |

TABLE III

| Material | Ceramic Areal Density (kg/m$^2$) | Backing Areal Density (kg/m$^2$) | Calc. $V_{50}$ (m/s) | $V_{50}$ per Unit Total Areal Density (m$^3$/kg/s) |
|---|---|---|---|---|
| RBSC Composition "A" | 13.78 | 9.480 | 819.3 | 35.2 |
| RBSC Composition "B" | — | — | — | — |
| Hot Pressed B$_4$C | 16.62 | 5.913 | 848.3 | 37.6 |

Inspection of the normalized $V_{50}$ test data shows that, in terms of ballistic performance (e.g., ballistic stopping power), the instant silicon carbide composite materials were not far behind that of hot pressed boron carbide. Specifically, the $V_{50}$ values of the instant RBSC materials, normalized for total areal density, were within about 10 percent of those of hot pressed boron carbide, which is considered a top-performing ceramic armor material. Because the instant RBSC materials can be produced to tighter thickness specifications in the as-thermally processed condition than can hot pressed boron carbide, this 10 percent ballistic stopping power advantage of boron carbide armor relative to the instant RBSC materials will be diminished somewhat when the dimensional tolerance issue is factored in. Thus, it is fair to say that the performance of the instant RBSC armor materials approaches that of a premier armor material, hot pressed boron carbide.

EXAMPLE 10

This example demonstrates the degree of dimensional reproducibility that can be maintained in producing curved armor plates using a reaction bonding technique for the ceramic densification process. In a manufacturing run using substantially the same procedure as described in Example 2, twenty-one composite armor breastplates were produced. Ten thickness measurements were made around the periphery and in the middle of each of these breastplates. For each breastplate, the mean, range, standard deviation and coefficient of variation of the thickness was computed, then these values were averaged. Table IV reports the thickness variation from a mean thickness of about 0.449 centimeters. Specifically, Table IV reports the average and the highest (representing the breastplate exhibiting the greatest thickness variation) values for each of these four quantities.

TABLE IV

|  | Mean (cm) | Range (microns) | Std. Dev. (microns) | Coefficient of Variation |
| --- | --- | --- | --- | --- |
| Average: | 0.449 | 254 | 81.3 | 1.83% |
| Highest: | 0.452 | 406 | 132 | 2.93% |

In contrast, a production run of boron carbide breastplates made by hot pressing and intended to have a mean thickness of about 0.69 cm displayed a thickness standard deviation of about 250 microns.

Industrial Applicability

The ceramic armors of the instant invention, possessing the desirable properties of low specific gravity and high hardness, should be particularly useful against small arms fire, e.g., as body armor, and as aircraft armor. The instant ceramic armors might also find application in marine vessels and ground-based vehicles, e.g., for armor protection against heavier threats. The ability to produce ceramic armor having a very uniform and reproducible thickness (e.g., using the instant RBSC technology) is important for being able to manufacture commercial quantities of this product without having to grind or machine the faces of the ceramic armor body to meet the specified dimensions and tolerances.

An artisan of ordinary skill will readily appreciate that numerous variations and modifications can be made to the invention as disclosed and exemplified above without departing from the scope of the invention as set forth in the appended claims.

What is claimed is:

1. A ballistic armor, comprising a ceramic layer and a backing layer attached to said ceramic layer;
    the ceramic layer comprising a composite body comprising a reinforcement phase and a matrix phase;
    wherein the reinforcement phase comprises at least one hard ceramic filler material distributed throughout the matrix phase;
    wherein the matrix phase comprises silicon carbide;
    wherein the reinforcement phase and the matrix phase each possess a microstructure consisting of morphological features, and wherein at least 90 percent by volume of said morphological features are smaller than about 100 microns in size; and
    wherein the reinforcement phase and the matrix phase make up at least 70 percent by volume of the composite body.

2. The ballistic armor of claim 1, wherein the filler material comprises silicon carbide.

3. The ballistic armor of claim 1, wherein the composite body further comprises silicon distributed throughout the matrix phase.

4. The ballistic armor of claim 1, wherein said morphological features comprise grains.

5. The ballistic armor of claim 1, wherein said morphological features comprise crystallites.

6. The ballistic armor of claim 5, wherein substantially all of said crystallites are smaller than about 106 microns in diameter.

7. The ballistic armor of claim 1, wherein said backing layer comprises at least one fiber-reinforced plastic material.

8. The ballistic armor of claim 7, wherein said fiber comprises at least one material selected from the group consisting of polyethylene, aramid and glass.

9. The ballistic armor of claim 1, wherein said composite material comprises at least 65 percent by volume of said at least one filler material.

10. The ballistic armor of claim 1, wherein said at least one filler material comprises at least one ceramic material selected from the group consisting of silicon carbide, titanium carbide and titanium diboride.

11. The ballistic armor of claim 1, wherein said composite body has a four-point flexural strength of at least about 260 MPa.

12. The ballistic armor of claim 1, wherein said composite material comprises no more than about 24 percent by volume of said silicon carbide of said matrix.

13. The ballistic armor of claim 1, wherein said bodies making up said filler material have a Vickers hardness of at least about 2400 kg/mm$^2$.

14. The ballistic armor of claim 1, wherein said body comprises a composite material comprising (i) a matrix comprising silicon carbide, and (ii) no more than about 30 percent by volume of an infiltrant phase comprising silicon dispersed throughout said matrix phase, and further wherein said body has a hardness of at least about 1670 kg/mm$^2$ as measured with a Vickers indenter using a 1 kg load.

15. The ballistic armor of claim 1, wherein said body has a ballistic stopping power of at least about 35.2 m$^3$/kg/s when tested under the following conditions:
    7.62 mm projectile
    SpectraShield® polymer composite backing material
    total areal density of about 23.25 kg/m$^2$
    outer tactical vest simulant comprising 28 plies of KM2 (600 denier) blanket comprising rip-stop nylon.

16. A method for making a ballistic armor, comprising:
    (a) providing at least one backing layer;
    (b) producing a ceramic layer comprising a composite body comprising a reinforcement phase and a matrix phase, said producing comprising
        (1) providing at least one of a permeable mass or preform comprising at least one carbon source and by volume at least 70 percent of at least one hard filler material and having at least 90 percent by volume of bodies making up said filler being no larger than about 100 microns in size;

(2) heating an infiltrant comprising silicon to at least its melting point, thereby forming a molten infiltrant;

(3) in a vacuum or inert atmosphere, and at a temperature sufficiently low as to avoid recrystallization, contacting said molten infiltrant to at least one of said permeable mass or preform;

(4) infiltrating said molten infiltrant into said permeable mass or preform, and reacting said silicon with said carbon source to form silicon carbide; and (5) continuing said infiltrating and reacting at least until said formed silicon carbide forms an at least partially interconnected structure; and (c) relative to the direction of travel of an impinging projectile, attaching said backing layer to said ceramic layer at a location that is behind said ceramic layer.

17. The method of claim 16, wherein once said permeable mass is provided, said mass thereafter is never exposed to a temperature in excess of about 2100° C.

18. The method of claim 16, wherein said carbon source is provided as a carbonaceous resin, which resin is subsequently pyrolyzed.

19. The method of claim 16, wherein said carbon source is provided as elemental carbon.

20. The method of claim 16, wherein said elemental carbon makes up no more than about 10 volume percent of said permeable mass.

21. The method of claim 16, wherein said bodies making up said filler material comprise particulate.

* * * * *